United States Patent [19]

Lamb

[11] 4,202,181
[45] May 13, 1980

[54] FUEL CONSERVATION CONTROLLER FOR HEATING AND REFRIGERATION APPARATUS

[76] Inventor: Jeffrey W. Lamb, 172-41 Highland Ave., Jamaica Estates, N.Y. 11432

[21] Appl. No.: 908,109

[22] Filed: May 22, 1978

Related U.S. Application Data

[63] Continuation-in-part of Ser. No. 779,735, Mar. 21, 1977, Pat. No. 4,090,372.

[51] Int. Cl.² ............................................. F25B 15/00
[52] U.S. Cl. ........................................ 62/141; 62/476
[58] Field of Search ................. 62/141, 160, 180, 156, 62/148, 476; 165/22, 2

[56] References Cited

U.S. PATENT DOCUMENTS

| | | | |
|---|---|---|---|
| 2,948,124 | 8/1960 | Emburg, Sr. | 62/141 |
| 3,099,139 | 7/1963 | Mann et al. | 62/185 |
| 3,250,084 | 5/1966 | Anderson | 62/212 |
| 3,488,975 | 1/1970 | Nelson | 62/212 |
| 3,661,200 | 5/1972 | McNamara | 62/112 |
| 3,667,246 | 6/1972 | St. Lorant et al. | 62/208 |
| 3,750,419 | 8/1973 | Bawel | 62/141 |
| 3,823,572 | 7/1974 | Cochran, Jr. | 62/160 |
| 3,837,174 | 9/1974 | Miyagi et al. | 62/141 |
| 3,864,930 | 2/1975 | Hopkins | 62/141 |
| 3,895,499 | 7/1975 | Hopkins | 62/141 |

*Primary Examiner*—Lloyd L. King
*Attorney, Agent, or Firm*—Hubbell, Cohen, Stiefel & Gross

[57] ABSTRACT

A controller for regulating the energy consumption of a closed, variable capacity heating or refrigeration system comprises means for sensing at least two parameters, each indicative of the most energy efficient system capacity based on the parameter sensed, means for selecting the signal indicative of the most energy efficient system capacity and for providing an output signal indicative thereof, and means for comparing the output signal from the selecting means with the actual capacity of the system and for generating a signal indicative of the change in capacity necessary to adjust the actual system capacity to the most energy efficient capacity.

5 Claims, 5 Drawing Figures

FUEL CONSERVATION CONTROLLER FOR HEATING AND REFRIGERATION APPARATUS

CROSS REFERENCES TO RELATED APPLICATIONS

This application is a continuation-in-part of copending application Ser. No. 779,735, filed Mar. 21, 1977, now U.S. Pat. No. 4,090,372 the entire contents of which are hereby incorporated herein by reference.

BACKGROUND OF THE INVENTION

1. Field of the Invention

This invention pertains to variable capacity refrigeration and heating systems and more particularly to control systems for controlling the capacity of such systems.

2. Description of the Prior Art

Absorption type refrigeration systems for chilling a fluid medium which may then be used to provide refrigeration to any desired location are well known. Typically, such systems are controlled by providing a temperature sensor which senses the temperature of the fluid medium either as it enters or leaves the evaporator. The signal from this sensor is then used to control the capacity of the refrigeration system in accordance with the load requirements. In an absorption type refrigeration system, this is accomplished by controlling the concentration of the refrigerant-absorbent solution supplied to the absorber.

Other control systems, such as those disclosed in U.S. Pat. Nos. 3,099,139 and 3,250,084 employ two separate temperature sensors, one disposed to sense the temperature of the fluid medium entering the refrigeration system and another to sense the temperature of the fluid medium after it has been cooled by the refrigeration system. However, these control systems, as well as the other prior art control systems known to applicant, are only adapted to vary the refrigeration capacity of the system in response to varying load conditions and not in response to changes in the internal conditions in the refrigeration system itself. Thus, when there is a malfunction in the refrigeration system, such as fan breakage, fouling, accumulation of noncondensibles, etc., prior art control systems normally result in maximum energy input to the refrigeration system as they attempt to compensate for the malfunction. Thus, these control systems are extremely inefficient from a fuel consumption point of view.

Other exemplary refrigeration control systems are disclosed in U.S. Pat. Nos. 3,661,200; 3,667,246; 3,823,572; and 3,912,344.

SUMMARY OF THE INVENTION

According to the invention, I have developed a controller for a closed, variable capacity heating or refrigeration system which serves to reduce the energy consumption on the system, the term "closed" connoting that the system is one in which a medium having thermal storage capacity is continuously recirculated through the system.

The controller includes at least two parameter sensing devices, each disposed for sensing a parameter indicative of what the most energy efficient system capacity is. Each parameter sensing device generates an output tracking signal indicative of variations in its sensed parameter. The output tracking signals are then compared by a comparator which selects the lowest signal and provides a first output control signal indicative thereof. The output control signal is then compared with the output signal of a parameter sensing device disposed to sense a parameter indicative of the actual system capacity at any given time. The output from this latter comparator is a second output control signal indicative of the change in system capacity necessary to adjust the actual system capacity to the most energy efficient capacity. After being suitably conditioned this signal is then applied to the energy input regulating device of the system being controlled to effect the necessary change.

The components of the controller may be pneumatic, fluidic, electrical or solid state, although I presently prefer to employ pneumatic components as these are both reliable and inexpensive.

In a preferred embodiment of the controller, a sub-circuit is incorporated which serves to gradually increase the energy input to the system at start-up. Thus, it is well known that at start-up the system typically calls for maximum system capacity and hence maximum energy input and that the condition of maximum energy at start-up is inefficient. Therefore, the controller preferably includes a parameter sensing device disposed for sensing the temperature of the medium returned to the system, differential amplifier means for comparing the supply temperature of the medium with its return temperature and for providing an output signal indicative of the difference therebetween, and means for comparing the output signals from the differential amplifier and the reset controller and for providing an output signal indicative of the one having the lower value. It will thus be apparent that during start-up the energy input to the system will be regulated by the output from the difference comparator which will remain lower than the output from the reset controller until a predetermined point set by the initial calibration is reached. At that point the output from the reset controller will be lower than the output from the different differential amplifier with the effect that the energy input to the system will again be regulated by the output from the reset controller.

Other changes and modifications of the controller, such as one for insuring that a minimum system capacity will always be maintained, will become more fully apparent from the following detailed description and annexed drawings of the preferred embodiments thereof.

DETAILED DESCRIPTION OF THE PREFERRED EMBODIMENTS

Figure 1:
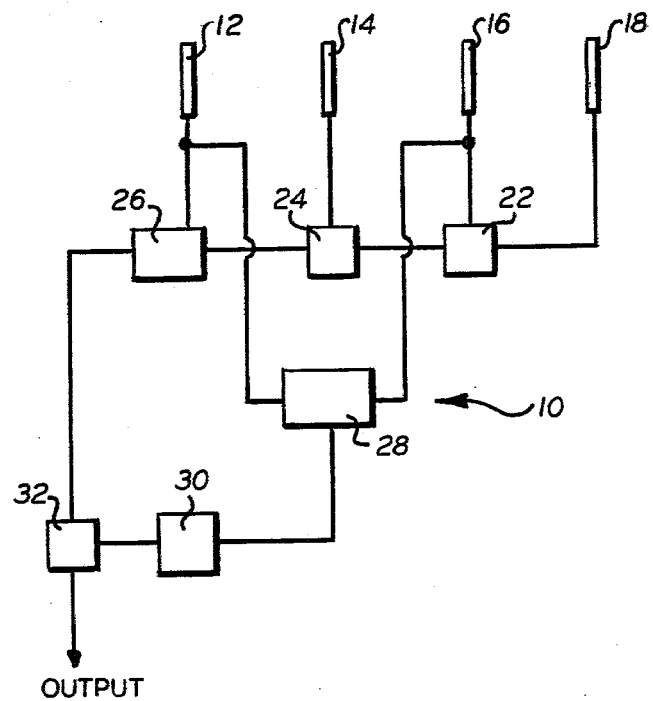
FIG. 1 is a schematic representation of a controller in accordance with the present invention.

Referring now to the drawings and initially FIG. 1 thereof, the preferred control system 10 in accordance with my invention is shown. As will be more fully appreciated hereinafter, the system 10 may be used to regulate the energy consumption of any closed, variable capacity system of the type employed to obtain a predetermined climate in an area remote from the system, the term "closed" connoting that the system is one in which a medium having thermal storage capacity is continuously recirculated through the system. Thus, for example, the controller 10 may be used in connection with absorption, centrifugal or mechanical refrigeration or heating systems. Solely for purposes of simplifying this description, it will be assumed that the controller 10 is used to regulate an absorption type refrigeration system such as the one described in connection with the controller of my previously filed U.S. application Ser. No. 779,735 and shown in FIG. 5 herein, although after reading this description those skilled in the art will immediately recognize that the controller 10 may be used in connection with any closed, variable capacity system of the type discussed hereinabove.

Figure 5:
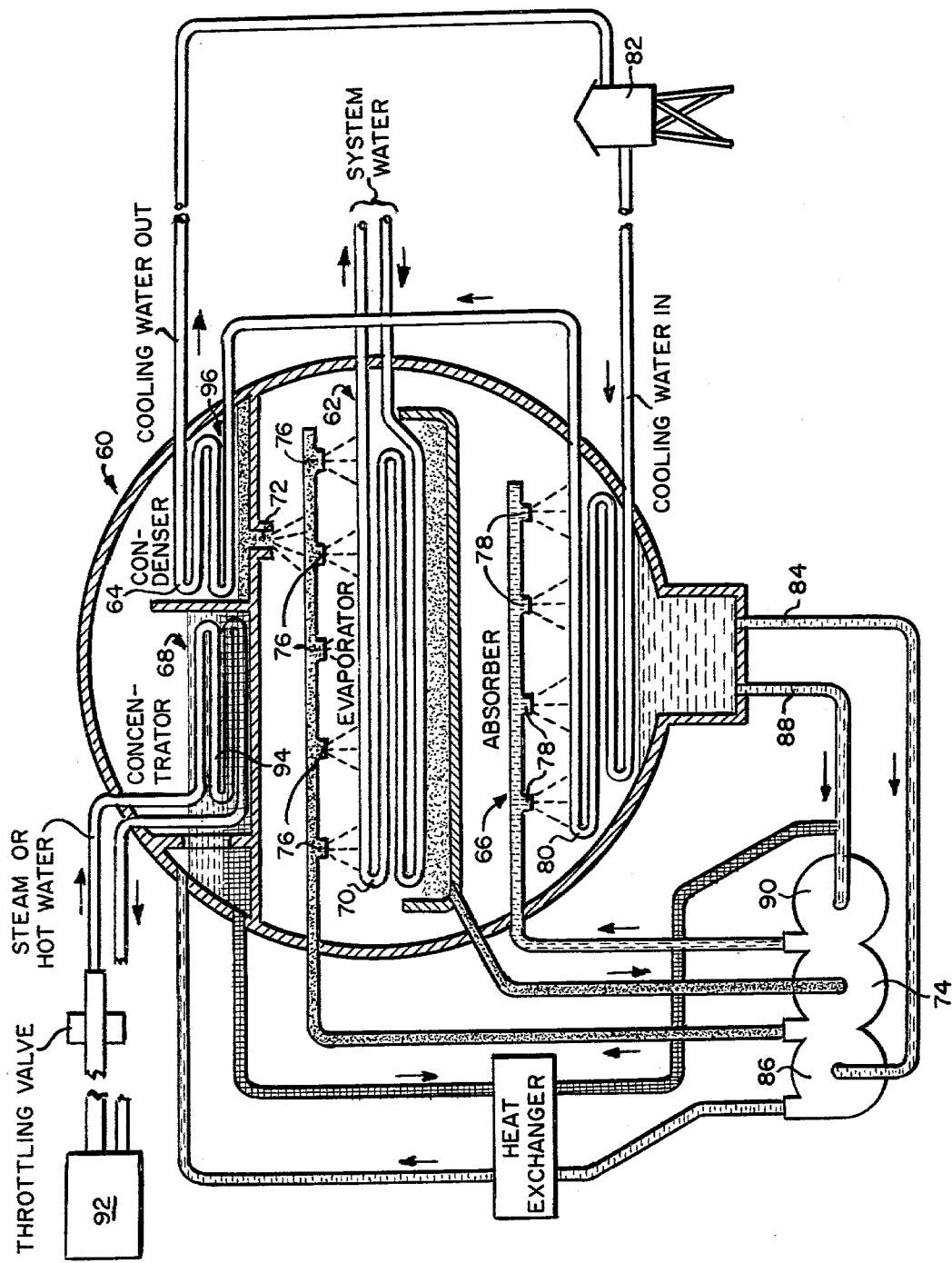
FIG. 5 is a diagrammatic illustration of an absorption type refrigeration system suitable for regulation by the controller of the present invention.

Referring now to FIG. 5, conventional absorption type refrigeration system 60 includes evaporator 62, condenser 64, absorber 66, and concentrator 68. In operation the fluid medium to be chilled is circulated through a coil 70 in the evaporator 62. Since the fluid medium is most commonly water it will be assumed for purposes of this description that water (hereinafter referred to as the system water) is circulating through coil 70.

A refrigerant enters evaporator 62 from condenser 64 through orifice 72. As the refrigerant vaporizes it absorbs its latent heat of vaporization thereby cooling and condensing the remainder of the refrigerant which collects at the bottom of the evaporator 62. The liquid refrigerant is then fed through evaporator pump 74 to spray trees 76 which spray the referigerant on the coil 70. As the refrigerant contacts the coil 70 it extracts heat from the water thereby cooling the system water and causing the refrigerant to boil. The vaporized refrigerant then passes into the absorber 66.

In the absorber 66, an absorbent is sprayed through spray trees 78 onto the refrigerant vapor. The referigerant vapor emanating from the evaporator condenses in the liquid absorbent solution to form a dilute solution which collects at the bottom of the absorber 66. The heat of condensation given up by the refrigerant during this process is removed by condensing water which circulates through a coil 80 disposed in the absorber 66. The condensing water may come, for example, from a cooling tower 82.

The dilute solution collected at the bottom of the absorber 66 passes out of the absorber in two controlled streams. One stream 84 passes into a pump 86 which pumps the solution into the concentrator 68. In the concentrator 68 the refrigerant is boiled out of the dilute solution thus producing a concentrated referigerant-absorbent solution. This concentrated solution is then mixed with the second controlled stream of dilute solution 88. Mixed together, these solutions produce an intermediate refrigerant-absorbent solution. Absorber pump 90 then pumps this intermediate solution into the absorber 66 through spray trees 78.

It will be apparent that heat must be supplied to the dilute solution in the concentrator 68 to raise the temperature high enough to drive out the water vapor. Most commonly, and is shown in FIG. 5, this is accomplished by circulating steam from a low pressure steam source 92 through a coil 94 disposed in the concentrator 68. The water vapor boiled out of the concentrator 68 migrates to the condenser 64 which is maintained at a slightly lower pressure than the pressure found in the concentrator.

A coil 96, through which cooling water is circulated, is disposed in the condenser 64. Upon contacting coil 96 the vaporized refrigerant is cooled and condensed. The liquid refrigerant collects at the bottom of the condenser and eventually passes through the orifice 72 into the evaporator 62 thereby completing the refrigerant cycle.

Referring now to FIG. 1, the controller 10 according to the invention includes a plurality of parameter sensing devices 12, 14, 16 and 18. One of these sensing devices, here shown to be the sensing device 12, is positioned to sense the actual capacity of the absorption refrigeration system whose energy consumption is being regulated. Although skilled art workers will recognize that this may be accomplished in a variety of ways, it is presently preferred that the parameter sensing device 12 comprises a temperature transmitter disposed to sense variations in the temperature of the chilled water in the supply line. Additional parameter sensing devices 14, 16 and 18 are disposed to sense parameters indicative of what the system capacity should be if energy consumption is to be optimized.

While this may be accomplished by sensing a number of different parameters, I prefer to employ the parameter sensing devices 14, 16 and 18 to sense, respectively, the dry bulb temperature of the air outside the climate being regulated, the temperature of the water in the return line to the absorption refrigeration system and the temperature of the dilute solution in the absorber. To accomplish these measurements, I once again prefer to employ temperature transmitters whose outputs are indicative of variations in the sensed temperature.

Thus, and as is more fully explained in my U.S. application No. 779,735, the contents of which have already been incorporated by reference herein in its entirety, a reduction in the temperature of the water in the return line is indicative of the fact that the actual available system capacity is not being utilized and, therefore, that it is possible to reduce the capacity of the system and hence the energy consumption thereof while still meeting system demands. Similarly, and as is also explained in my U.S. application Ser. No. 779,735, a rise in the temperature of the dilute solution in the absorber is indicative of certain system malfunctions such as, for example, fouling, which reduce the capacity of the system. When the system capacity is reduced beyond a given point, it is no longer energy efficient to attempt to satisfy system demands by increasing the energy consumption of the system in the hope of providing sufficient capacity. Thus, as the temperature of the dilute solution rises above the level indicative that this point has been reached, it is desirable to gradually reduce the actual system capacity to minimize this inefficiency. Of course, the signal from the sensor 18 could also be used to activate an indicating means, such as a light, which would inform the operator of the malfunction. Similarly, a drop in the temperature of the air outside the regulated climate as detected by the temperature sensing device 14 is indicative of the fact that demand is lessening and, therefore, that the actual capacity of the system may be reduced and the system demands still met. While the excess capacity of the absorption refrigeration system as detected by the outside air temperature sensor 14 would also eventually be detected by a decrease in the return water temperature as indicated by the temperature sensor 16, the addition of the sensor 14 is desirable since it anticipates that a reduction in the system capacity is forthcoming. Nevertheless, sensing of the return water temperature is desirable since it detects other changes in system conditions which are also indicative of the lowest acceptable system capacity such as, for example, the fact that system demand has increased or decreased due to reasons other than a drop in the outside air temperature.

As shown, the signals from the temperature transmitters 16 and 18 are applied to a comparator circuit 22. The comparator compares the two input signals, selects the signal having the lower value, and provides an output signal indicative of the signal selected. The output signal from the temperature transmitter 14 and the output signal from the comparator 22 are then compared in a second comparator circuit 24. Like the comparator 22, the comparator 24 compares the signals from the transmitter 14 and the comparator 22, selects the signal having the lower value, and provides an output signal indicative of the selected signal. Those skilled in the art will appreciate that the effect of the comparisons made by the comparators 22 and 24 is to select the signal indicating the lowest, and hence most energy efficient, acceptable system capacity. This signal, which is indicated by the output signal from the comparator 24, is then applied to a reset controller 26. The reset controller compares the output signal from the comparator 24 with the reference signal from the temperature transmitter 12 which, as noted above, is indicative of the actual system capacity at any given time. The reset controller 26 then provides an output signal indicative of the change in system capacity necessary to adjust the actual system capacity to the lowest acceptable system capacity as indicated by the output from the comparator 24. In the absorption refrigeration system under consideration, this change could be accomplished by suitably conditioning the output signal from the reset controller 26 to control the operation of, for example, a steam input throttling valve. Other arrangements will suggest themselves to those skilled in the art.

The portion of the control system 10 described thus far will function to reduce the system capacity, and hence energy input, whenever such a reduction is possible as indicated by the outputs from the temperature transmitters 14, 16 and 18. Thus, the portion of the controller 10 described thus far is capable, under most operating conditions, of accomplishing the desired result and is, therefore, complete by itself.

However, it is generally desirable to take into account the conditions which prevail when the heating or refrigeration system regulated by the controller 10 is first activated. Thus, referring again to FIG. 1 and still assuming that the controller 10 is being used in connection with an absorption type refrigeration system, and assuming further that the refrigeration system has been shut down for a sufficient time such that the supply water temperature is substantially equal to the return water temperature, the skilled art worker will appreciate that when the absorption refrigeration system is first activated the output signal from the reset controller 26 will invariably indicate that the actual system capacity as indicated by the output signal from the temperature transmitter 12 is far below the needed system capacity. Without more, this would mean that the output signal from the reset controller 26 would be sufficient to effect full opening of the steam throttling valve. However, it is well known that full opening of the steam throttling valve under these conditions is extremely energy inefficient, and that more of the increased energy input would be converted to increased system capacity if the steam throttling valve was opened gradually. Therefore, to effect gradual opening of the steam throttling valve under start-up conditions, I have developed an additional sub-circuit for incorporation into the portion of the controller 10 described thus far, the sub-circuit comprising a differential comparator 28, an amplifier 30, and a comparator 32. As shown, the output signals from the temperature transmitters 12 and 16, in addition to being applied to the reset controller 26 and the comparator 22, respectively, are also applied to the inputs of the differential comparator 28 which compares the two signals and provides an output signal indicative of the difference therebetween. The magnitude of the output signal from the differential comparator 22 is modified by the amplifier 30 which may or may not be necessary depending upon initial calibration of the controller 10. The output signals from the reset controller 26 and amplifier 30 are then compared by the comparator 32 which selects the lower signal and provides an output signal indicative thereof. It will thus be apparent that the sub-circuit comprised of the differential comparator 28, amplifier 30, and comparator 32 serves to further reduce the energy consumption of the absorption refrigeration system by effecting a gradual restoration of equilibrium conditions under startup and other surge conditions. Of course, and as will be apparent to those skilled in the art, the point at which the output from the reset controller 26 will be lower than the output signal from the amplifier 30 whereby the output signal from the reset controller 26 will, from that point on, regulate system capacity, will depend on the initial calibration of the various components which make up the controller 10.

Based on the description of the controller 10 given thus far, those skilled in the art will appreciate that the control circuitry can be either pneumatic, electric, fluidic, or solid state, or any combination of these. Presently, I prefer to employ pneumatic components as I have found these to be highly reliable and relatively inexpensive. Thus, assuming that pneumatic components are used, the temperature transmitters 12, 14, 16 and 18 may comprise those manufactured by Johnson Service Co. as their Model No. T 5210; the comparators 22, 24 and 32 may be those manufactured by Powers Regulator Co. and sold as their Model No. 2430009; the reset controller 26 may be the T 9020 manufactured by Johnson Service Co.; the differential comparator 28 may be the 2430009, manufactured by Powers Regulator Co.; and the amplifier 30 may be the T 5312, manufactured by Johnson Service Co. Furthermore, it should be apparent from FIG. 1 that the temperature transmitter 18 should be reverse acting, i.e., its output should decrease in response to an increase in dilute solution temperature. Assuming that a T 5210 temperature sensor is employed, this can easily be accomplished by inserting a signal reversing relay, such as Powers' Model No. 2430009, in the line between the transmitter 18 and the comparator 22. Furthermore, while I have included in the controller 10 three parameter sensing devices 14, 16 and 18 each indicative of acceptable system capacity, two or more than three such sensors may be employed. If additional sensors are added, it will be apparent to those skilled in the art that additional comparators, one for each added sensor, will also be required. Also, while the particular circuit for the controller 10 shown and described in FIG. 1 is preferred, it is not mandatory and skilled art workers will appreciate that other circuits which accomplish the same results could be devised.

Typically, the temperature transmitters 12, 14, 16 and 18 will provide a 0.12 psi change in output pressure for each 1° F. change in temperature. Continuing the assumption that the controller 10 is used in connection with an absorption type refrigeration system, and assuming further that in the absence of the controller 10 the refrigeration system would produce 45° F. chilled water, the following calibrations for the transmitters 12, 14, 16 and 18 are typical: chilled water supply temperature 45° F., 10 psi output signal from temperature transmitter 12; 70° F. outside air temperature, 10 psi output signal from temperature transmitter 14; 55° F. return water temperatures, 10 psi output signal from temperature transmitter 16; and 100° F. dilute solution temperature, 10 psi output signal from temperature transmitter 18.

Figure 2:
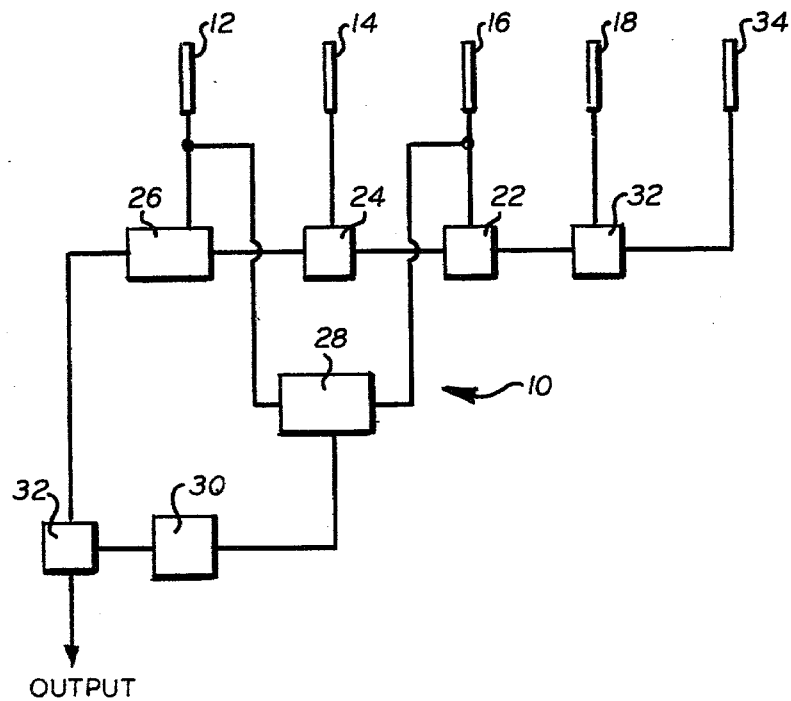
FIG. 2 is a schematic representation of a modified version of the controller illustrated in FIG. 1.

Referring now to FIG. 2, it will be appreciated that the heating or refrigeration system regulated by the controller 10 will often be incorporated in a facility having other energy demands. The system shown in FIG. 2 is designed to take this into account and to reduce the system capacity, and hence the energy input to the system, whenever the other energy demands of the facility exceed a predetermined limit. The controller 10 illustrated in FIG. 2 is in all respects identical to the controller 10 of FIG. 1 save for the fact that an additional parameter sensing device 34 and an additional comparator 36 have been added. The output signal from the transmitter 34 is indicative of the other energy demands of the facility. Thus, for example, assuming the energy demands of the facility are measured electrically, the transmitter 34 may comprise a device capable of measuring wattage and providing an output signal indicative thereof. Thus, it will be apparent from the foregoing that whenever the output signal from the sensor 34 is lower than the output signal from the sensors 14, 16 and 18, the output from the reset controller 26 will control the steam throttling valve or other mechanism to reduce the system capacity despite the fact that system demands may not be fully met. However, this is necessary to insure that other facility services, such as elevators, receive sufficient energy during periods of peak load.

It is sometimes necessary to maintain certain parameters of the climate controlled by the heating or cooling system within predetermined limits. In hospital applications, for example, it may be necessary to maintain the temperature in a certain room at or below 69° F. This situation is taken into account by the controller 10 illustrated in FIG. 3 which is in all respects identical to the controller 10 of FIG. 1 save for the fact that an additional parameter sensing device 40 and a limit switch 42 have been added. The parameter device 40 is disposed to sense the particular parameter under consideration, in this case room temperature. As shown, the output signal from the temperature sensor 40 is applied to a limit switch 42 disposed directly before the reset controller 26. As long as the output signal from the temperature sensor 40 indicates that the room temperature is below the predetermined limit, the output signal from the reset controller 26 will be based on the output signal from the comparator 24. However, should the output signal from the temperature sensor 40 indicate that the room temperature is at or near the predetermined limit, the output signal from the sensor 40 will override, via the limit switch 42, the output signal from the comparator 24, and will signal the reset controller that an increase in system capacity is needed. It will therefore be apparent that under these conditions the energy input to the system and hence the system capacity will be increased despite the fact that this may be energy inefficient as indicated by the readings from the other sensors 14, 16 and 18.

Figure 3:
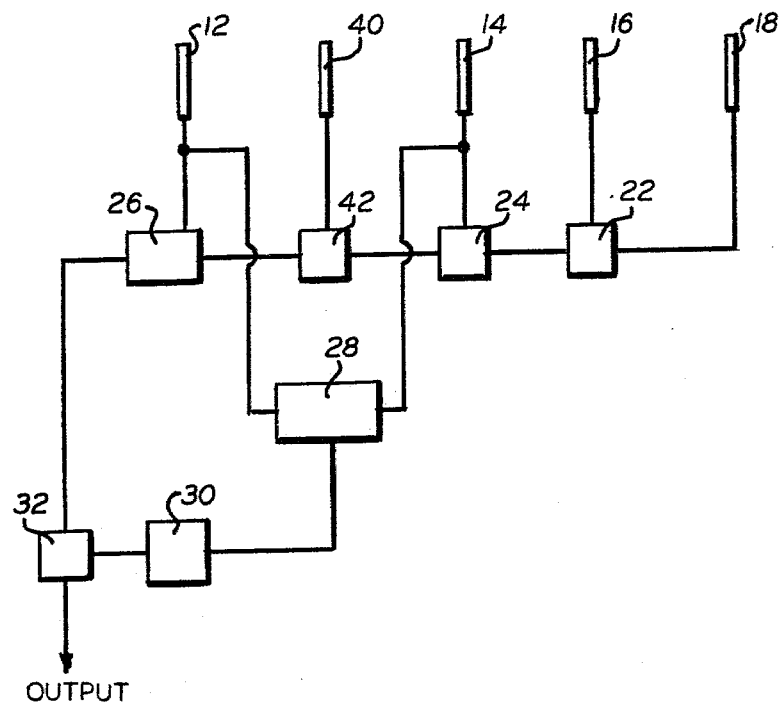
FIG. 3 is another schematic representation illustrating a still further modification of the controller illustrated in FIG. 1.
Figure 4:
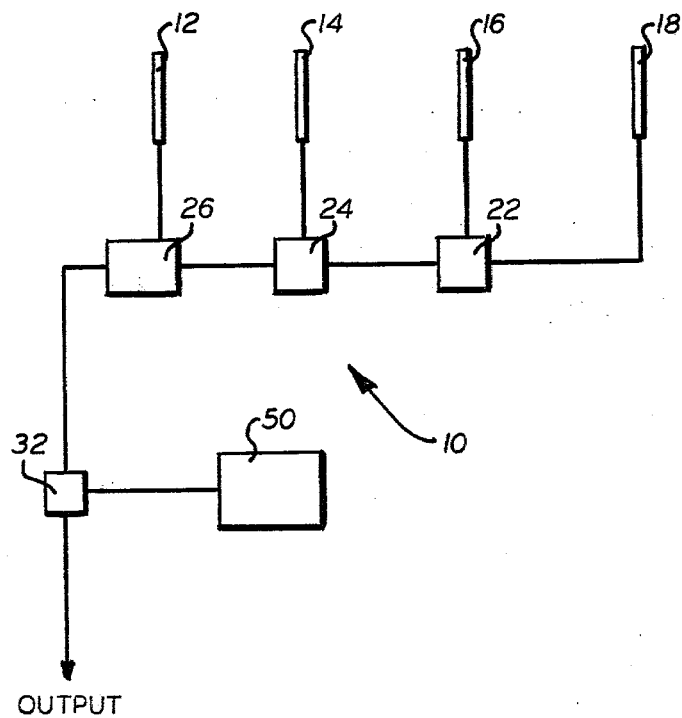
FIG. 4 is a schematic representation of yet another modified version of the controller illustrated in FIG. 1.

A further modification of the controller 10 of FIGS. 1–3 is illustrated in FIG. 4 wherein the differential comparator 28 and the amplifier 30 have been replaced by a simulator 50 which is activated upon activation of the heating or refrigeration system being regulated. The output signal from simulator 50 increases with time to a predetermined value and thus serves to simulate the output from the amplifier 30 in FIG. 1 at start-up. Assuming again that the controller 10 illustrated in FIG. 4 is being used in connection with an absorption refrigeration system and that the components of the controller are pneumatic, the simulator 50 may comprise, for example, a volume tank and restrictor. The operation of the controller 10 illustrated in FIG. 4 is in all other respects identical to the operation of the controller 10 of FIG. 1.

Those skilled in the art will appreciate that still additional changes and modifications of the controller 10 of the invention may be made. For example, it may be desirable to set an upper limit on the output signal from the controller 10 applied to the enery input control mechanism or the system being regulated. This can readily be accomplished, for example, by applying a predetermined signal to a high signal selector relay disposed after the comparator 32 of FIGS. 1–4. Thus, if the output signal from the comparator 32 is greater than the predetermined signal, the output from the high signal selector relay would be indicative of the predetermined signal thus placing an upper limit on the output signal from the controller 10. Additionally, and as noted above, the various parameter sensing devices may be used to sense parameters other than those discussed hereinabove. For example, the parameter sensing device 14 may, instead of sensing outside air temperature, be adapted to sense relative humidity, dew point, etc.

Since these as well as other changes and modifications are intended to be within the scope of the present invention, the above description should be construed as illustrative, and not in a limiting sense, the scope of the invention being defined by the following claims.

What is claimed is:

1. A controller for reducing the energy consumption of a closed, variable capacity system of the type used for modifying the climate of an area remote from the system, said system including means for varying the energy input to the system for varying the capacity thereof, said controller comprising:

first parameter sensing means disposed for sensing a first parameter indicative of the actual capacity of the system at any given time and for providing a first tracking signal output indicative thereof;

second parameter sensing means disposed for sensing a second parameter indicative of the most energy efficient system capacity based on said second parameter and for providing a second tracking signal output indicative thereof;

third parameter sensing means for sensing a third parameter indicative of the most energy efficient system capacity based on said third parameter and for providing a third tracking signal output indicative thereof;

means operatively connected to said second and third tracking signal outputs for comparing said second and third tracking signals, selecting the one indicative of the most energy efficient system capacity and for providing a first control signal output indicative of said one tracking signal;

means operatively connected to said first tracking signal output and said first control signal output for comparing said first tracking signal indicative of said actual system capacity with said first control signal indicative of said most energy efficient system capacity and for providing a second control signal output indicative of the change in energy input necessary to adjust said actual system capacity to said most energy efficient capacity; and means operatively connected to said second control signal output and responsive to said second control signal for controlling said capacity varying means to effect said change.

2. The controller according to claim 1, wherein said closed, variable capacity system includes a fluid medium and supply and return lines for recirculating said medium; wherein said first parameter is the temperature of said fluid medium in said supply line and said second parameter is the temperature of said fluid medium in said return line; further comprising difference amplifier means operatively connected to said first and second tracking signal outputs for comparing said first and second tracking signals and for providing a third control signal output indicative of the difference between said first and said second tracking signals; means operatively connected to said second and third control signal outputs for comparing said second and third control signals, selecting the one having the lower value, and for providing a fourth control signal indicative of said one control signal; and wherein said means for controlling said capacity varying means is responsive to said fourth control signal.

3. The controller according to claim 1, further comprising means for providing an increasing signal output upon activation of said variable capacity system; means operatively connected to said second control signal output and said increasing signal output for comparing said second control signal and said increasing signal, selecting the one having the lower value, and for providing a fourth control signal output indicative of the selected signal; and wherein said means for controlling said capacity varying means is responsive to said fourth control signal.

4. The controller according to claim 1, and further comprising means for maintaining said actual system capacity above a predetermined minimum level.

5. The controller according to claim 1, and further comprising means for maintaining said actual system capacity below a predetermined maximum level.

* * * * *